(12) United States Patent
Choi et al.

(10) Patent No.: US 9,102,360 B2
(45) Date of Patent: Aug. 11, 2015

(54) REINFORCING STRUCTURE OF REAR SPRING SEAT

(71) Applicant: Hyundai Motor Company, Seoul (KR)

(72) Inventors: Seung Chan Choi, Seoul (KR); Young Eun Ahn, Ulsan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 167 days.

(21) Appl. No.: 13/938,107

(22) Filed: Jul. 9, 2013

(65) Prior Publication Data

US 2014/0232146 A1 Aug. 21, 2014

(30) Foreign Application Priority Data

Feb. 18, 2013 (KR) .................. 10-2013-0016948

(51) Int. Cl.
*B62D 21/11* (2006.01)
*B62D 21/09* (2006.01)
*B62D 25/08* (2006.01)
*B62D 25/20* (2006.01)

(52) U.S. Cl.
CPC ................ *B62D 21/11* (2013.01); *B62D 21/09* (2013.01); *B62D 25/088* (2013.01); *B62D 25/2027* (2013.01)

(58) Field of Classification Search
CPC .... B62D 21/11; B62D 21/09; B62D 25/2027; B62D 25/088; B60G 13/003; B60G 15/067
See application file for complete search history.

(56) References Cited

U.S. PATENT DOCUMENTS

| | | | |
|---|---|---|---|
| 2,370,211 A * | 2/1945 | Ulrich | ...................... 296/203.03 |
| 6,464,239 B1 | 10/2002 | Kim | |
| 6,547,281 B1 * | 4/2003 | Iwatsuki | ....................... 280/785 |
| 7,040,639 B2 * | 5/2006 | Tamura | ................... 280/124.147 |
| 7,703,805 B2 * | 4/2010 | Sasaki et al. | ................... 280/784 |
| 8,276,926 B2 * | 10/2012 | Koyama | ................ 280/124.109 |
| 2006/0061142 A1 * | 3/2006 | Kobayashi et al. | ...... 296/203.04 |
| 2007/0215402 A1 * | 9/2007 | Sasaki et al. | .................. 180/232 |
| 2007/0246971 A1 * | 10/2007 | Hanakawa et al. | ...... 296/203.01 |
| 2010/0327570 A1 | 12/2010 | Koyama | |
| 2012/0138757 A1 * | 6/2012 | Hong et al. | ................. 248/205.1 |

FOREIGN PATENT DOCUMENTS

| | | |
|---|---|---|
| JP | 2011-005969 A | 1/2011 |
| KR | 2001-0047721 A | 6/2001 |
| KR | 10-2005-0115021 A | 12/2005 |
| KR | 10-2006-0011173 A | 2/2006 |
| KR | 2006-0011173 A | 2/2006 |

* cited by examiner

*Primary Examiner* — Drew Brown
(74) *Attorney, Agent, or Firm* — McDermott Will & Emery LLP

(57) ABSTRACT

A reinforcing structure of a rear spring seat for a vehicle includes a rear spring seat mounted on a rear side member and outer and inner reinforcing members provided at the outside and inside of the rear spring seat, respectively, wherein a lower portion of the outer reinforcing member is extended to cover an outer lower end of the rear spring seat.

9 Claims, 5 Drawing Sheets

REINFORCING STRUCTURE OF REAR SPRING SEAT

CROSS-REFERENCE TO RELATED APPLICATION

This application claims benefit of priority to Korean Patent Application No. 10-2013-0016948, filed on Feb. 18, 2013 in the Korean Intellectual Property Office, the disclosure of which is incorporated by reference herein in its entirety.

TECHNICAL FIELD

The present disclosure relates to a reinforcing structure of a rear spring seat for a vehicle, and more particularly, to a reinforcing structure of a rear spring seat for a vehicle in which outer and inner rigidities are increased.

BACKGROUND

In general, a rear spring seat for a vehicle serves to fix a rear suspension to a car body and support load in a vertical direction transmitted from the suspension to the car body.

A conventional rear spring seat for a vehicle is referenced below.

Referring to FIG. 1, a spring seat 10 is disposed at the outside of a side member 20, a reinforcing bracket 30 is disposed at the outside of the spring seat 10 for reinforcement, and a diaphragm 40 is mounted at the inside of the side member 20 so as to obtain rigidity of the spring seat 10.

However, the conventional rear spring seat fails to sufficiently reinforce the rigidity of the outer portion of the spring seat, such that load transmitted from the rear suspension may not be supported stably.

SUMMARY

Accordingly, the present disclosure has been made to solve the above-mentioned problems occurring in the prior art while advantages achieved by the prior art are maintained intact.

A reinforcing structure of a rear spring seat for a vehicle according to an exemplary embodiment of the present disclosure, sufficiently reinforces rigidity of inner and outer sides of the spring seat, thereby stably support the load transmitted from a rear suspension.

An aspect of the present disclosure provides a reinforcing structure of a rear spring seat for a vehicle including: a rear spring seat mounted on a rear side member; and outer and inner reinforcing members disposed at the outside and inside of the rear spring seat, respectively, wherein a lower portion of the outer reinforcing member is extended to cover an outer lower end of the rear spring seat.

An upper portion of the outer reinforcing member may extended in a "∩" shape to be coupled with a wheel housing so as to increase the rigidity of the outer reinforcing member.

The outer reinforcing member may be formed to have a "[" shaped cross-section, and may be attached to the wheel housing to form a closed cross-section between the outer reinforcing member and the wheel housing.

A lower portion of the inner reinforcing member may be extended to cover an inner lower end of the rear spring seat.

An upper portion of the inner reinforcing member may be extended along and attached to a lower panel body so as to increase the rigidity of the inner reinforcing member.

The inner reinforcing member may be formed to have a "[" shaped cross-section, and may be attached to the lower panel body to form a closed cross-section between the inner reinforcing member and the lower panel body.

An upper reinforcing member may be mounted on an upper portion of the rear side member so that a closed cross-section is formed between the rear side member and the upper reinforcing member.

A secondary reinforcing member may be mounted between the rear spring seat and the outer reinforcing member, where one end of the secondary reinforcing member being coupled with an upper surface of the spring seat and the other end being coupled with a side surface of the rear side member.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE PREFERRED EMBODIMENTS

Figure 1:
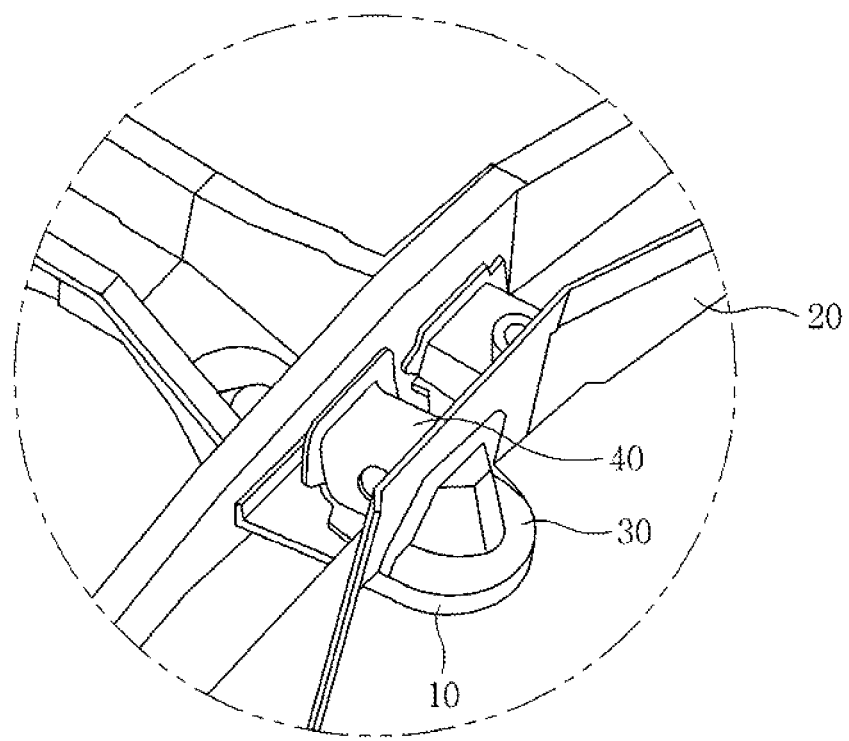
FIG. 1 is a view showing a rear spring seat according to the related art.

A reinforcing structure of a rear spring seat for a vehicle according to the present disclosure reinforces outer and inner sides using outer and inner reinforcing members, respectively, and outer and inner reinforcing structures are extended to cover a lower end of the rear spring seat so as to increase supporting rigidity of the rear spring seat.

Hereinafter, embodiments of the present disclosure will be described in detail with reference to the accompanying drawings so that they can be easily practiced by those skilled in the art to which the present disclosure pertains. However, the described embodiments may be modified in various different ways and are not limited to the embodiments provided in this disclosure. In the accompanying drawings, portions unrelated to the description will be omitted in order not to obscure the present disclosure, and like reference numerals will be used to refer to like elements throughout the present specification.

Figure 2:
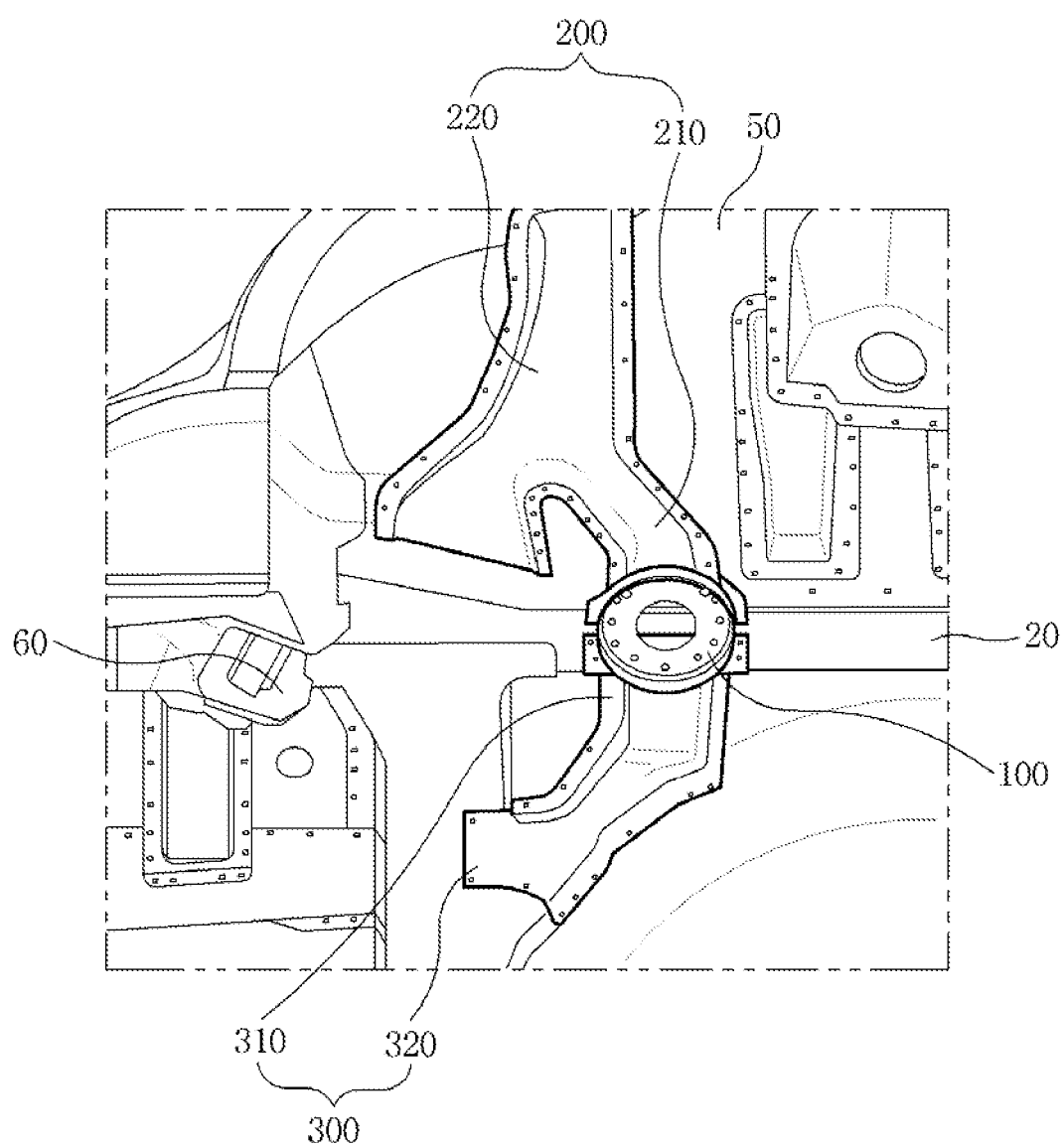
FIG. 2 is a bottom view of a reinforcing structure of a rear spring seat for a vehicle according to an embodiment of the present disclosure.
Figure 3:
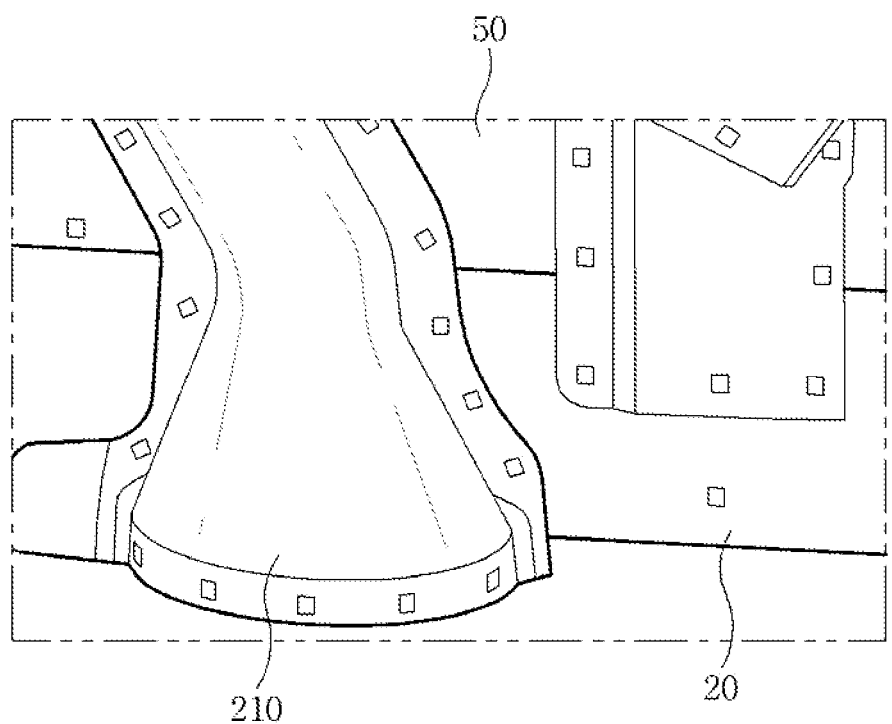
FIG. 3 is a perspective view of an outer reinforcing member of the reinforcing structure of a rear spring seat for a vehicle according to the embodiment of the present disclosure.

Referring to FIGS. 2 and 3, a reinforcing structure of a rear spring seat for a vehicle according to an embodiment of the present disclosure includes a rear spring seat 100 of which a part is coupled with a rear side member 20 by welding; outer and inner reinforcing members 200 and 300 mounted on outer and inner sides of the rear spring seat 100 to reinforce outer and inner rigidity, respectively; an upper reinforcing member 400 coupled with an upper portion of the rear side member 20 by welding so as to increase supporting force of the rear spring seat 100 by increasing the rigidity of the rear side member 20; and a secondary reinforcing member 500 provided between the rear spring seat 100 and the outer reinforcing member 200 so as to reinforce the rigidity of the rear spring seat 100.

The outer reinforcing member 200 serves to reinforce outer rigidity of the rear spring seat 100. A lower portion 210 thereof is extended to cover the outer lower end of the rear spring seat 100 so as to increase the rigidity from the outer upper portion to the lower portion of the rear spring seat 100, and an upper portion 220 is extended in "∩" shape along a wheel housing 50 formed above the rear side member 20 and coupled with so as to increase the supporting rigidity of the outer reinforcing member 200.

That is, the outer reinforcing member 200 is extended to the lower end of the rear spring seat 100 so as to reinforce the rigidity at the lower end of the rear spring seat 100, and thereby stably supporting load and vibration transmitted from a rear suspension by the rear spring seat 100.

The outer reinforcing member 200 is formed to have a "[" shaped cross-section and attached to the wheel house 50 to form a closed cross-section in a "☐" shape between the outer reinforcing member 200 and the wheel housing 50. As the supporting rigidity of the outer reinforcing member 200 is increased, the supporting rigidity of the outer side of the rear spring seat 100 is increased.

An inner reinforcing member 300 serves to reinforce inner rigidity of the rear spring seat 100. A lower portion 310 thereof is extended to cover an inner lower end of the rear spring seat 100 so as to increase the rigidity from the inner upper portion to the lower portion of the rear spring seat 100, and an upper portion 320 is extended along a lower panel body 60 and attached thereto so as to increase the rigidity of the inner reinforcing member 300.

That is, the inner reinforcing member 300 is extended to the inner lower end of the rear spring seat 100 so as to reinforce the rigidity of the lower end of the rear spring seat 100, thereby stably supporting the load and vibration transmitted from the rear suspension by the rear spring seat 100.

The inner reinforcing member 300 is formed to have a "[" shaped cross-section, and attached to the lower panel body 60 so as to form a closed cross-section in a "☐" shape between the inner reinforcing member 300 and the lower panel body 60. As the supporting rigidity of the inner reinforcing member 300 is increased, the supporting rigidity of the inner side of the rear spring seat 100 is increased.

Figure 4:
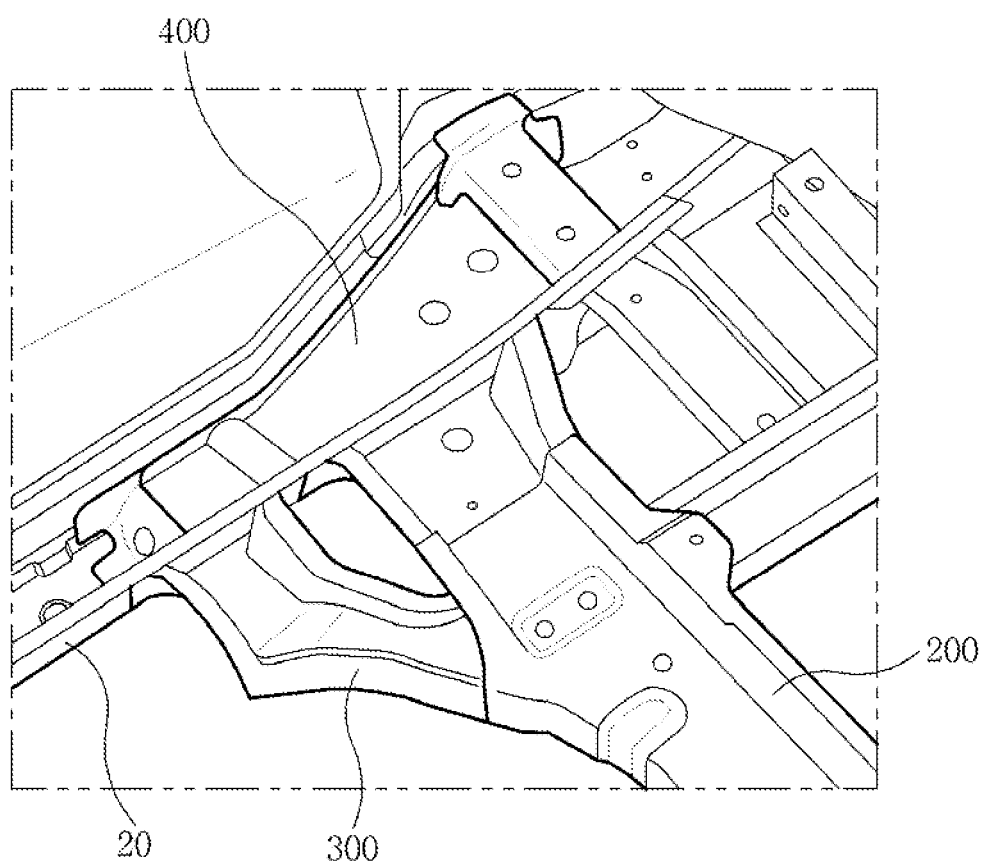
FIG. 4 is a perspective view of an upper reinforcing member of the reinforcing structure of a rear spring seat for a vehicle according to the embodiment of the present disclosure.

Referring to FIG. 4, the upper reinforcing member 400 serves to increase the supporting rigidity of the upper side of the rear spring seat 100 by the rear side member 20. The upper reinforcing member 400 is inserted into the upper portion of the rear side member 20 and coupled with the rear side member 20 by welding, thereby forming a closed cross-section in a "☐" shape between the rear side member 20 and the upper reinforcing member 400. Accordingly, the supporting rigidity of the rear side member 20 is increased, thereby rigidly supporting the rear spring seat 100 mounted on the rear side member 20.

Figure 5:
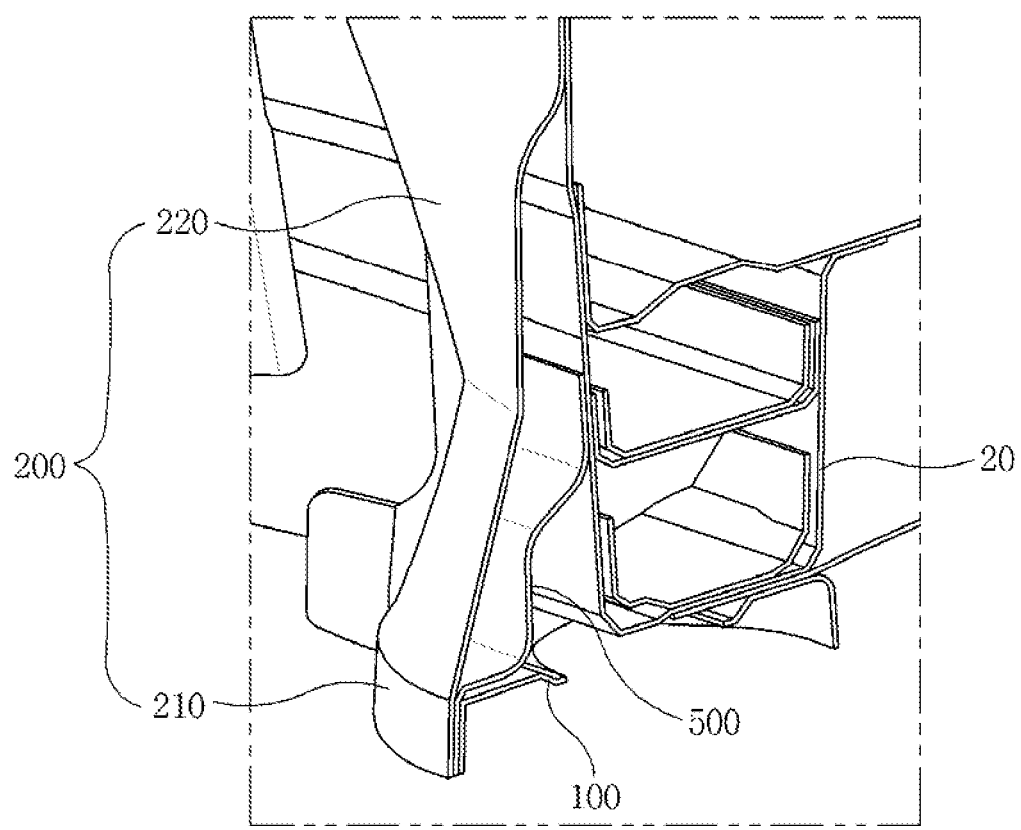
FIG. 5 is a perspective view of a cross-section of a secondary reinforcing member of the reinforcing structure of a rear spring seat for a vehicle according to the embodiment of the present disclosure.

Referring to FIG. 5, the secondary reinforcing member 500 serves to further increase the rigidity of the rear spring seat 100. One end of the secondary reinforcing member 500 is coupled with the upper surface of the rear spring seat 100 by welding, between the rear spring seat 100 and the outer reinforcing member 200, and the other end is coupled with the side surface of the rear side member 20 by welding.

That is, the secondary reinforcing member 500 is mounted to be inclined between the rear spring seat 100 and the rear side member 20 and reinforces the supporting rigidity so as not to deform the outer side of the rear spring seat 100 upwardly.

Accordingly, the reinforcing structure of the rear spring seat reinforces the rigidity at the outer side and inner lower end of the rear spring seat 100, thereby stably supporting the load transmitted to the rear spring seat 100.

As set forth above, the inner and outer rigidity of the spring seat is reinforced, as well as the rigidity at the lower portion of the spring seat, thereby stably supporting the load transmitted to the spring seat.

It should be appreciated that the scope of the present disclosure is defined by the following claims rather than the above-mentioned detailed descriptions and all modifications or alterations deduced from the meaning, the scope, and equivalences of the claims are to be construed as falling within the scope of the present disclosure.

What is claimed is:

1. A reinforcing structure of a rear spring seat for a vehicle, the structure comprising: a rear spring seat mounted on a rear side member; and outer and inner reinforcing members provided outside and inside of the rear spring seat, respectively, wherein a lower portion of the outer reinforcing member is extended to cover an outer lower end of the rear spring seat, wherein a secondary reinforcing member is mounted between the rear spring seat and the outer reinforcing member, one end of the secondary reinforcing member being coupled with an upper surface of the spring seat and the other end being coupled with a side surface of the rear side member.

2. The structure according to claim 1, wherein an upper portion of the outer reinforcing member is extended in a ".andgate." shape to be coupled with a wheel housing, so as to increase rigidity of the outer reinforcing member.

3. The structure according to claim 1, wherein the outer reinforcing member is prepared as a member having a "[" shaped cross-section, and is attached to a wheel housing to form a closed cross-section between the outer reinforcing member and the wheel housing.

4. The structure according to claim 1, wherein a lower portion of the inner reinforcing member is extended to cover an inner lower end of the rear spring seat.

5. The structure according to claim 1, wherein an upper portion of the inner reinforcing member is extended along and attached to a lower panel body so as to increase rigidity of the inner reinforcing member.

6. The structure according to claim 1, wherein the inner reinforcing member is prepared as a member having a "[" shaped cross-section, and is attached to a lower panel body to form a closed cross-section between the inner reinforcing member and the lower panel body.

7. The structure according to claim 1, wherein an upper reinforcing member is mounted on an upper portion of the rear side member so that a closed cross-section is formed between the rear side member and the upper reinforcing member.

8. A reinforcing structure of a rear spring seat for a vehicle, the structure comprising: a rear spring seat mounted on a rear side member; and outer and inner reinforcing members provided outside and inside of the rear spring seat, respectively, wherein a lower portion of the outer reinforcing member is extended to cover an outer lower end of the rear spring seat,
  wherein the inner reinforcing member is prepared as a member having a "[" shaped cross-section, and is attached to a lower panel body to form a closed cross-section between the inner reinforcing member and the lower panel body.

9. A reinforcing structure of a rear spring seat for a vehicle, the structure comprising: a rear spring seat mounted on a rear side member; and outer and inner reinforcing members provided outside and inside of the rear spring seat, respectively, wherein a lower portion of the outer reinforcing member is extended to cover an outer lower end of the rear spring seat,
wherein an upper reinforcing member is mounted on an upper portion of the rear side member so that a closed cross-section is formed between the rear side member and the upper reinforcing member.

* * * * *